(12) United States Patent
Wang et al.

(10) Patent No.: US 7,843,084 B2
(45) Date of Patent: Nov. 30, 2010

(54) ELECTRONIC DEVICE CAPABLE OF AUTOMATICALLY SELECTING A POWER SOURCE

(75) Inventors: Han-Che Wang, Taipei Hsien (TW); Xin Zhao, Shenzhen (CN); Hong-Sheng Ouyang, Shenzhen (CN); Xiao-Guang Li, Shenzhen (CN); Shin-Hong Chung, Taipei Hsien (TW)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 223 days.

(21) Appl. No.: 12/175,440

(22) Filed: Jul. 17, 2008

(65) Prior Publication Data
US 2009/0039709 A1 Feb. 12, 2009

(30) Foreign Application Priority Data
Aug. 8, 2007 (CN) .......................... 2007 1 0075632

(51) Int. Cl.
*H02J 1/00* (2006.01)
*H02J 3/00* (2006.01)
(52) U.S. Cl. ........................................................ 307/80
(58) Field of Classification Search .................. 307/80, 307/86
See application file for complete search history.

(56) References Cited

U.S. PATENT DOCUMENTS
2007/0018502 A1* 1/2007 Bazinet ........................ 307/80

FOREIGN PATENT DOCUMENTS
CN 2838129 Y 11/2006

* cited by examiner

*Primary Examiner*—Jared J Fureman
*Assistant Examiner*—Carlos Amaya
(74) *Attorney, Agent, or Firm*—Zhigang Ma

(57) ABSTRACT

An exemplary electronic device capable of automatically selecting a power source includes two power ports configured to connect to external power sources and a battery compartment configured to receive a battery module. The voltage of the battery module is higher than at least one of the external power sources. The electronic device further includes a power selection module allocated between the battery module and the power port which selects the lower voltage. Three diodes are respectively located on the output path of the three power sources. A path switch that controls whether power to the device comes from the battery compartment or a power port is located between the anode of the battery compartment and the diode located on the output path of the battery module. Among the multiple power sources, the external power source providing a higher voltage is the first to be chosen to power the electronic device.

14 Claims, 3 Drawing Sheets

ELECTRONIC DEVICE CAPABLE OF AUTOMATICALLY SELECTING A POWER SOURCE

BACKGROUND

1. Technical Field

The present invention relates to an electronic device capable of automatically selecting a power source.

2. General Background

Nowadays, electronic devices (e.g., mobile phones and media players) are supplied with power from an AC/DC adapter which converts power from a wall outlet, a built-in battery, or another electronic device via an interface (e.g., a USB interface). If an electronic device is capable of receiving power from more than one power source, there is a need for the electronic device to automatically select one power source.

A typical power source auto-switch device can switch power between a battery, a USB interface, and an AC/DC adapter. However, the power from the USB interface can only be supplied to the device when the battery is disconnected. Therefore, if the electronic device needs to be powered by the USB interface instead of the battery, the battery must either be disconnected or physically removed from the electronic device, creating an inconvenience to the user.

Therefore, an electronic device capable of automatically selecting a power source is desired to overcome the above-described deficiencies.

SUMMARY

The present invention provides an electronic device capable of automatically selecting a power source.

The electronic device includes: a battery compartment, a first power port, a second power port, a DC/DC converter, a path switch, a power selection module, and at least three unidirectional switches.

The battery compartment is configured for receiving a battery module. The first power port is configured for connecting to a first external power source which provides power with a voltage higher than a voltage of the battery module. The second power port is configured for connecting with a second external power source which provides power with a voltage lower than the voltage of the battery module. The DC/DC converter is configured for converting the power from either the battery module, the first external power source, or the second external power source to supply the required voltage to power the electronic device. A unidirectional switch is configured for conducting power from the first power port to the DC/DC converter when being forward biased between the first power port and the DC/DC converter. Another unidirectional switch is configured for conducting the power from the second power port to the DC/DC converter when being forward biased between the second power port and the DC/DC converter. A third unidirectional switch is configured for conducting the power from the battery module to the DC/DC converter when being forward biased between the battery compartment and the DC/DC converter.

The path switch is connected between the battery compartment and the third unidirectional switch, for maintaining or cutting off power from the battery module to the third unidirectional switch. The power selection module is connected to the battery compartment, the second power port and the path switch. The power selection module controls the path switch to switch off when the second power port is connected to the second external power source, cutting off power from the battery module to the third unidirectional switch.

Other advantages and novel features will become more apparent from the following detailed description of embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present electronic device. Moreover, in the drawings, like reference numerals designate corresponding parts throughout the several views.

DETAILED DESCRIPTION OF THE EMBODIMENTS

Figure 1:
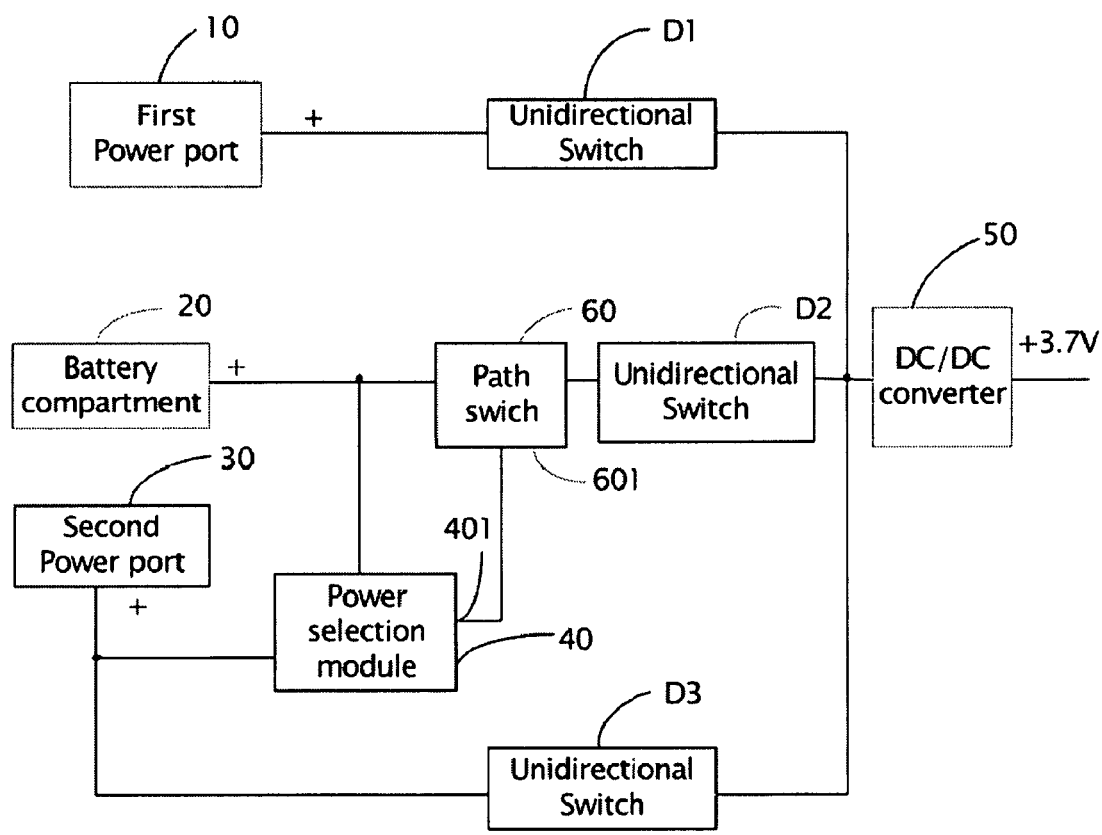
FIG. 1 is a block diagram of an electronic device capable of automatically selecting a power source in accordance with a first embodiment of the present invention.

FIG. 1 is a block diagram of a first embodiment of an electronic device. The electronic device includes a first power port 10, a battery compartment 20, a second power port 30, a power selection module 40, a DC/DC converter 50, a path switch 60, and a plurality of unidirectional switches D1, D2, and D3. The first power port 10 is configured to connect to a first external power source (not shown), and the second power port 30 is configured to connect to a second external power source (not shown). The battery compartment 20 is configured to receive a battery module (not shown); the battery module can have one or more batteries. The DC/DC converter 50 is configured to convert power from either the first external power source, the second external power source, or the battery module into the required voltage (e.g. 3.7 volts (V)), to power the electronic device. In the first embodiment, the first external power source provides a relatively high voltage (e.g., 12V), the second external power source provides a relatively low voltage (e.g., 5V), and the battery module provides a voltage between the relatively high voltage and the relatively low voltage (e.g., 7.2V).

The anode of the power port 10 is connected to an input port (not shown) of the DC/DC converter 50 via the unidirectional switch D1. The anode of the battery compartment 20 is connected to the input port of the DC/DC converter 50 via the path switch 60 and the unidirectional switch D2. The anode of the second power port 30 is connected to the input port (not shown) of the DC/DC converter 50 via the unidirectional switch D3. The power selection module 40 is connected between the battery compartment 20, the second power port 30, and the path switch 60. The power selection module 40 includes an output port 401 which is connected to a control port 601 of the power path switch 60.

To illustrate one embodiment, the electronic device is powered by the first external power source via the first power port 10 when the first external power source is present. When the second external power source is present, the electronic device is powered by the second external power source via the second power port 20. When the battery module is present, the electronic device is powered by the battery module in the battery compartment 20.

If the first external power source, the second external power source, and the battery module are present, the unidirectional switch D1 is switched on while the unidirectional switches D2 and D3 are switched off. The DC/DC converter 50 obtains power from the first external power source and converts the power from the first external power source to the required voltage.

If only the second external power source and the battery module are present, the output port 401 of the power selection module 40 sends an off signal to the control port 601 to switch off the path switch 60, thereby cutting off the connection between the battery compartment 20 and the DC/DC converter 50. Hence, the DC/DC converter 50 obtains power only from the second external power source and converts it to the required voltage.

If only the battery module is present, the power selection module 40 outputs an on signal to the control port 601, to switch on the path switch 60. Then, the DC/DC converter 50 obtains power from the battery module and converts it to the required voltage.

Figure 2:
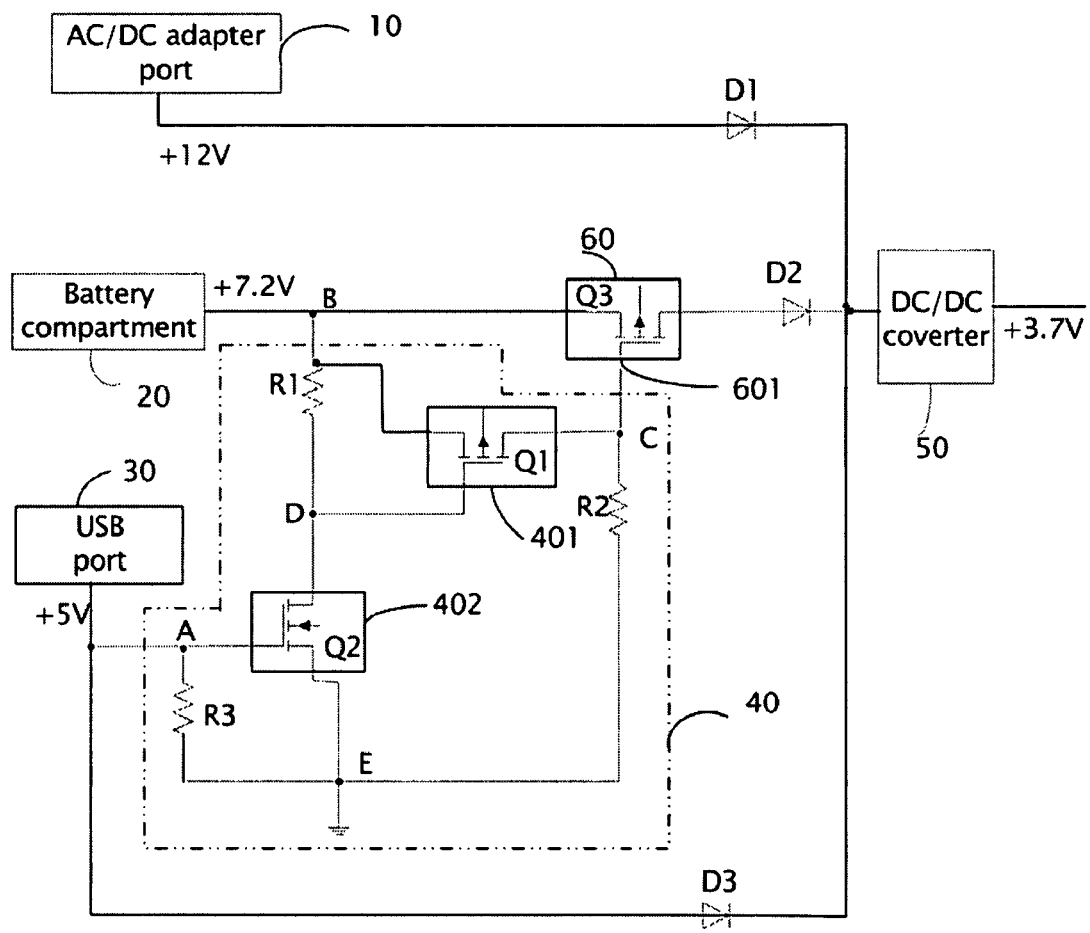
FIG. 2 is a circuit diagram of the electronic device of FIG. 1.

FIG. 2 is a circuit diagram of the electronic device. In this circuit, the first power port 10 can be an AC/DC adapter port 10 which is configured to connect to the first external power source, such as an AC/DC adapter. The second power port 30 can be a universal serial bus (USB) port 30 or an IEEE1394 port 30. The USB port 30 is configured to connect to a USB power source (e.g., a USB port of a computer) (not shown). The unidirectional switches D1, D2, D3 are diodes D1, D2, D3, respectively. An anode (not labeled) of the diode D1 is connected to an anode of the AC/DC adapter port 10, an anode (not labeled) of the diode D2 is connected to the anode of the battery compartment 20 through the path switch 60, and an anode (not labeled) of the diode D3 is connected to an anode of the USB port 30. Cathodes (not labeled) of the diodes D1, D2, D3 are all connected to the input port of the DC/DC converter 50.

In one embodiment, the AC/DC adapter port 10 provides a 12 volt (V) voltage, the USB port 30 provides a 5V voltage, and the battery compartment 20 provides a 7.2V voltage. The DC/DC converter 50 converts the 12V, 7.2V, and 5V voltages to a 3.7V voltage to power the electronic device.

The power selection module 40 includes a first switch 401 and a second switch 402. The first switch 401 is a low voltage activated switch and the second switch 402 is a high voltage activated switch. The first switch 401 and the second switch 402 both include a control terminal (not labeled), a first path terminal (not labeled), and a second path terminal (not labeled). The path switch 60 is a low voltage activated switch that also includes a control terminal (not labeled), a first path terminal (not labeled), and a second path terminal (not labeled). In one embodiment of the present invention, the first switch 401 and the path switch 60 are p-channel metal-oxide-semiconductor field-effect transistors (PMOSFETs) Q1, Q3 respectively, and the second switch 402 is an n-channel metal-oxide-semiconductor field-effect transistor (NMOSFET) Q2. Gates (not labeled), sources (not labeled), and drains (not labeled) of the MOSFETs Q1, Q2, Q3 constitute the control terminals, the first path terminals, and the second path terminals of the first switch 401, the second switch 402, and the path switch 60, respectively. The gate of the PMOSFET Q3 corresponds to the control port 601 of the path switch 60.

To illustrate one embodiment, the gate of the NMOSFET Q2 is symbolically expressed as node A which connects to the anode of the USB port 30, the node A further connects with a ground node E via a resistor R3, and the drain of the NMOSFET Q2 is symbolically expressed as node D which connects to the gate of the PMOSFET Q1. The node D further connects to the anode of the battery compartment 20 via a resistor R1. The source of the NMOSFET Q2 is grounded through the ground node E. The source of the PMOSFET Q1 is symbolically expressed as node B which connects to the anode of the battery compartment 20, and the drain of the PMOSFET Q1 is symbolically expressed as node C which connects to the gate of the PMOSFET Q3. The node C corresponds to the output port 401 of the power selection module 40. The gate of the PMOSFET Q3 connects with the ground node E via a resistor R2, the source of the PMOSFET Q3 connects with the node B, and the drain of the PMOSFET Q3 connects with the anode of the diode D2.

If the AC/DC adapter, the USB power source, and the battery module are present, the diode D1 is switched on and the diodes D2, D3 are both switched off, and the DC/DC converter 50 obtains the 12V voltage from the AC/DC adapter and converts the 12V voltage to the required voltage.

If only the USB power source and the battery module are present, the gate of the NMOSFET Q2 (namely node A) obtains a high voltage and controls the NMOSFET Q2 to switch on. The gate of the PMOSFET Q1 is connected to the ground node E by the NMOSFET Q2 and obtains a low voltage, so the PMOSFET Q1 is switched on. The gate of the PMOSFET Q3 is connected to the anode of the battery compartment through the PMOSFET Q1. The gate of the PMOSFET Q3 obtains a high voltage and controls the PMOSFET Q3 to switch off. The DC/DC converter 50 obtains the 5V voltage from the USB port 30 and converts the 5V voltage to the required voltage.

If only the battery module is present, the node A connects to the ground node E via the resistor R3 and obtains a low voltage, and the NMOSFET Q2 is switched off. The gate of the PMOSFET Q1 is connected to the anode of the battery compartment 20 through the resistor R1 and obtains a high voltage, so the PMOSFET Q1 is also switched off. The gate of the PMOSFET Q3 is connected to the ground node E through the resistor R2 and obtains a low voltage. The PMOSFET Q3 is then switched on. The DC/DC converter 50 obtains the 7.2V voltage from the battery module and converts the 7.2V voltage to the 3.7V voltage to power the electronic device.

In another embodiment, the first switch 401 and the path switch 60 can be bipolar junction transistors (BJTs). The first switch 401 and the path switch 60 can be positive-negative-positive (PNP) BJTs, and the second switch 402 can be a negative-positive-negative (NPN) BJT. The bases, emitters, and collectors of the PNP BJTs and the NPN BJT constitute the control terminals, the first path terminals, and the second path terminals, respectively, of the first switch 401, the second switch 402, and the path switch 60.

Figure 3:
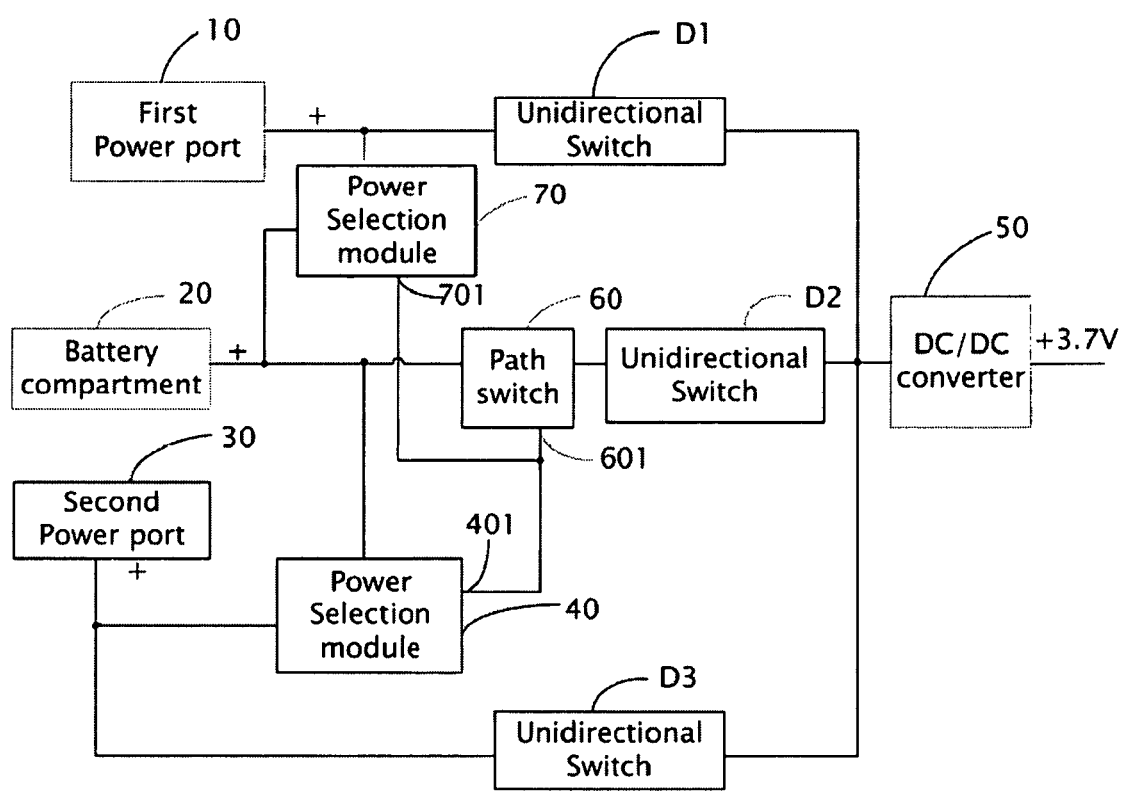
FIG. 3 is a block diagram of an electronic device capable of automatically selecting a power source in accordance with a second embodiment of the present invention.

FIG. 3 is a block diagram of a second embodiment of an electronic device capable of automatically selecting a power source. Here, the first external power source and the second external power source supply power with voltages that are lower than the voltage of the battery module. Compared to the first embodiment of the present invention, the electronic device further includes a power selection module 70 connected between the first power port 10 and the battery compartment 20. The power selection module 70 has the same structure and function as the power selection module 40, but also includes an output terminal 701 which connects with the control port 601 of the path switch 60.

If an external power source and the battery module are present, either power selection module 40 or 70 controls the path switch 60 to switch off, thereby selecting the external power source to power the electronic device. Furthermore, if both the first external power source and the second external power source are present, the unidirectional switch D1 or D3 is switched on or off depending on the voltages of the first external power source and the second external power source. For example, if the first external power source supplies a higher voltage than the second external power source, the unidirectional switch D1 is switched on and the unidirectional switch D3 is switched off. Otherwise, if the second external power source supplies a higher voltage than the first external power source, the unidirectional switch D3 is switched on and the unidirectional switch D1 is switched off. In this configuration, the external power source that supplies a higher voltage powers the electronic device.

In the embodiments, if there is both an external power source and a built-in power source (e.g., batter module), the electronic device will automatically select the external power source to power itself. If two or more external power sources are simultaneously present, the electronic device automatically selects the external power source which can provides a higher voltage to power itself.

It is believed that the present embodiments and their advantages will be understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. An electronic device capable of automatically selecting a power source, comprising:
    a battery compartment configured for receiving a battery module;
    a first power port configured to connect to a first external power source which provides power with a voltage higher than a voltage of the battery module;
    a second power port configured to connect to a second external power source which provides power with a voltage lower than the voltage of the battery module;
    a DC/DC converter configured for converting power from the battery module, the first external power source, or the second external power source to a required voltage to power the electronic device;
    at least three unidirectional switches, wherein a first one of the at least three unidirectional switches is configured for conducting the power from the first power port to the DC/DC converter when being forward biased between the first power port and the DC/DC converter; a second one of the at least three unidirectional switches is configured for conducting the power from the second power port to the DC/DC converter when being forward biased between the second power port and the DC/DC converter; and a third one of the at least three unidirectional switches is configured for conducting the power from the battery module to the DC/DC converter when being forward biased between the battery compartment and the DC/DC converter;
    a path switch connected between the battery compartment and the third unidirectional switch, for maintaining or cutting off power from the battery module to the third one of the at least three unidirectional switches;
    a power selection module connected to the battery compartment, the second power port, and the path switch, wherein the power selection module controls the path switch to switch off if the second power port is connected to the second external power source, cutting off power from the battery module to the third of the at least three unidirectional switches.

2. The electronic device of claim 1, wherein the power selection module comprises a first switch and a second switch; the first switch and the second switch each comprise a control terminal, a first path terminal, and a second path terminal; the path switch comprises a first path terminal, a second path terminal, and a control terminal; the control terminal of the second switch is connected to an anode of the second power port, the control terminal of the second switch is further connected to a ground node via a first resistor, the second path terminal of the second switch is connected to the control terminal of the first switch and an anode of the battery compartment via a second resistor; the first path terminal of the second switch is grounded; the first path terminal and the second path terminal of the first switch are connected to the anode of the battery compartment and the control terminal of the path switch, respectively; the first path terminal of the path switch is connected to the anode of the battery compartment, and the second path terminal of the path switch is connected to the DC/DC converter via the third one of the at least three unidirectional switches; and the control terminal of the path switch is connected to ground node via a third resistor.

3. The electronic device of claim 2, wherein the first switch and the path switch are P-channel Metal-Oxide-Semiconductor Field-Effect Transistors (PMOSFETs), the second switch is an N-channel Metal-Oxide-Semiconductor Field-Effect Transistor (NMOSFET); the control terminals, the first path terminals, and the second path terminals of the first switch, the second switch and the path switch correspond to gates, sources, and drains, respectively, of the PMOSFETs and the NMOSFET.

4. The electronic device of claim 2, wherein the first switch and the path switch are Positive-Negative-Positive bipolar junction transistors (PNP BJTs), the second switch is a Negative-Positive-Negative bipolar junction transistor (NPN BJT); and the control terminals, the first path terminals, and second path terminals of the first switch, the second switch and the path switch correspond to bases, emitters, and collectors, respectively, of the PNP BJTs and the NPN BJT.

5. The electronic device of claim 1, wherein the at least three unidirectional switches are diodes whose positive ends are connected to the first power port, the second power port and the battery compartment respectively.

6. An electronic device capable of automatically selecting a power source, comprising:
    a battery compartment configured for receiving one or more battery modules;
    a first power port configured to connect to a first external power source, which provides power with a voltage lower than a voltage of the battery module;
    a DC/DC converter connected to both the battery compartment and the first power port and configured for converting power from either the battery module or the first external power source to a suitable voltage to power the electronic device;
    a path switch connected between the battery compartment and the DC/DC converter, for maintaining or cut off power from the battery module to the DC/DC converter;
    a first power selection module connected to the battery compartment, the first power port and the path switch, wherein the first power selection module controls the path switch to switch off when the first power port is connected to the first external power source, cutting off power from the battery module to the DC/DC converter.

7. The electronic device of claim 6, wherein the first power selection module comprises a first switch and a second switch; the first switch and the second switch each comprise a control terminal, a first path terminal, and a second path terminal; the path switch comprises a first path terminal, a second path terminal, and a control terminal; the control terminal of the second switch is connected to an anode of the first power port, the control terminal of the second switch is further connected to a ground node via a first resistor, the second path terminal of the second switch is connected to the control terminal of the first switch and an anode of the battery compartment via a second resistor, the first path terminal of the second switch is grounded; the first path terminal and the second path terminal of the first switch are connected to the anode of the battery compartment and the control terminal of the path switch, respectively; the first path terminal of the path switch is connected to the anode of the battery compartment, the second path terminal of the path switch is connected to the DC/DC converter, and the control terminal of the path switch is connected to the ground node via a third resistor.

8. The electronic device of claim 7, wherein the first switch and the path switch are PMOSFETs, and the second switch is an NMOSFET; the control terminals, the first path terminals, and the second path terminals of the first switch, the second switch and the path switch correspond to gates, sources, and drains, respectively, of the PMOSFETs and the NMOSFET.

9. The electronic device of claim 7, wherein the first switch and the path switch are Positive-Negative-Positive bipolar junction transistor (PNP BJTs), a the second switch is a Negative-Positive-Negative bipolar junction transistor (NPN BJT); and the control terminals, the first path terminals, and second path terminals of the first switch, the second switch and the path switch correspond to bases, emitters, and collectors, respectively, of the PNP BJTs and the NPN BJT.

10. The electronic device of claim 7, further comprising:
a second power port connected to a second external power source, the second external power source providing power with a voltage lower than the voltage of the battery module;
a second power selection module connected with the battery compartment, the second power port and the path switch, for controlling the path switch to switch off when the second power port is connected to the second external power source, and cutting off power from the battery module to the DC/DC converter; and
at least two unidirectional switches, wherein a first one of the at least two unidirectional switches is configured for conducting power from the first power port to the DC/DC converter when being forward biased between the first power port and the DC/DC converter, and a second one of the at least two unidirectional switches is configured for conducting power from the second power port to the DC/DC converter when being forward biased between the second power port and the DC/DC converter.

11. The electronic device of claim 10, wherein the second power selection module comprises a third switch and a fourth switch; the third switch and the fourth switch each comprise a control terminal, a first path terminal, and a second path terminal; the control terminal of the fourth switch is connected to an anode of the second power port, the control terminal of the fourth switch is further connected to a ground node via a fourth resistor; the second path terminal of the fourth switch is connected to the control terminal of the third switch and the anode of the battery compartment via a fifth resistor; the first path terminal of the fourth switch is grounded; the first path terminal and the second path terminal of the third switch are connected to the anode of the battery compartment and the control terminal of the path switch, respectively; the first path terminal of the path switch is connected to the anode of the battery compartment, and the second path terminal of the path switch is connected to the DC/DC converter; and the control terminal of the path switch is connected to the ground node via a sixth resistor.

12. The electronic device of claim 11, wherein the third switch and the path switch are P-channel Metal-Oxide-Semiconductor Field-Effect Transistors (PMOSFETs), the fourth switch is an N-channel Metal-Oxide-Semiconductor Field-Effect Transistor (NMOSFET), and the control terminals, the first path terminals, and the second path terminals of the third switch, the path switch and the fourth switch correspond to gates, sources, and drains, respectively, of the PMOSFETs and the NMOSFET.

13. The electronic device of claim 11, wherein the third switch and the path switch are Positive-Negative-Positive bipolar junction transistors (PNP BJTs), and the fourth switch is a Negative-Positive-Negative bipolar junction transmitter (NPN BJT), the control terminals, the first path terminals, and the second path terminals of the third switch, the path switch, and the fourth switch correspond to bases, emitters, and collectors, respectively, of the PNP BJTs and the NPN BJT.

14. The electronic device of claim 10, wherein the at least two unidirectional switches are diodes whose positive ends are connected to the first power port and the second power port correspondingly.

* * * * *